US012649176B2

(12) United States Patent
Kondo et al.

(10) Patent No.: US 12,649,176 B2
(45) Date of Patent: Jun. 9, 2026

(54) WASHING APPARATUS

(71) Applicant: EBARA CORPORATION, Tokyo (JP)

(72) Inventors: Daichi Kondo, Tokyo (JP); Koji Maeda, Tokyo (JP); Kuniaki Yamaguchi, Tokyo (JP); Koichi Fukaya, Tokyo (JP); Kohei Sato, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 165 days.

(21) Appl. No.: 18/434,772

(22) Filed: Feb. 6, 2024

(65) Prior Publication Data

US 2024/0269720 A1 Aug. 15, 2024

(30) Foreign Application Priority Data

Feb. 10, 2023 (JP) ................................ 2023-019267

(51) Int. Cl.
*B08B 17/02* (2006.01)
*B08B 3/02* (2006.01)

(52) U.S. Cl.
CPC .............. *B08B 17/025* (2013.01); *B08B 3/02* (2013.01); *B08B 2203/0211* (2013.01)

(58) Field of Classification Search
CPC .. B08B 17/025; B08B 3/02; B08B 2203/0211
See application file for complete search history.

(56) References Cited

U.S. PATENT DOCUMENTS

2016/0271658 A1* 9/2016 Rebstock ................ B08B 9/283
2017/0236728 A1* 8/2017 Morioka ................ B05B 12/14
134/30
2021/0066071 A1* 3/2021 Then ................ H01L 21/02057

FOREIGN PATENT DOCUMENTS

CN 114582786 A * 6/2022 ............... B08B 3/02
JP 2004047714 2/2004
JP 2014075438 4/2014
KR 20200077119 6/2020
KR 20220140111 A * 10/2022 ............... B08B 3/02

OTHER PUBLICATIONS

CN114582786 translation (Year: 2022).*
KR20220140111 translation (Year: 2022).*

* cited by examiner

*Primary Examiner* — Michael E Barr
*Assistant Examiner* — Lauren G Orta
(74) *Attorney, Agent, or Firm* — JCIPRNET

(57) ABSTRACT

A washing apparatus includes: a housing; a holding part that holds a substrate arranged in the housing; a washing nozzle that supplies a washing liquid to the substrate held by the holding part; a gas nozzle that ejects a gas toward a ceiling of the housing; and a control part that controls the gas nozzle.

5 Claims, 4 Drawing Sheets

WASHING APPARATUS

CROSS-REFERENCE TO RELATED APPLICATION

This application claims the priority benefit of Japan application serial no. 2023-019267, filed on Feb. 10, 2023. The entirety of the above-mentioned patent application is hereby incorporated by reference herein and made a part of this specification.

TECHNICAL FIELD

The disclosure relates to a washing apparatus.

RELATED ART

In a washing apparatus of a semiconductor substrate processing apparatus, techniques of washing a semiconductor substrate and washing an inner wall of the washing apparatus are disclosed in Patent Document 1 (Japanese Patent Application Laid-Open No. 2004-47714) and Patent Document 2 (Japanese Patent Application Laid-Open No. 2014-75438).

By washing the inner wall of the washing apparatus, the contaminant adhering to the inner wall is removed, and even if a drying process is performed after a washing process on the semiconductor substrate is performed in the washing apparatus, the semiconductor substrate after washing is not contaminated by the contaminant adhered to the inner wall.

However, in the techniques described in Patent Document 1 and Patent Document 2, there is a possibility that droplets containing contaminants fall from the ceiling of the washing apparatus and adhere onto the semiconductor substrate due to disorderly splashing back of droplets during supply of the washing liquid to the substrate, humidity resulting from the washing liquid, etc. and thus contamination occurs.

SUMMARY

Embodiments of the disclosure propose the following means.

A first aspect of the disclosure is a washing apparatus including: a housing; a holding part that holds a substrate arranged in the housing; a washing nozzle that supplies a washing liquid to the substrate held by the holding part; a gas nozzle that ejects a gas toward a ceiling of the housing; and a control part that controls the gas nozzle.

According to the first aspect of the disclosure, droplets adhered to the ceiling of the housing can be caused to move, by the gas ejected from the gas nozzle, to a position at which they do not fall onto the substrate. Further, depending on the ejection frequency of the gas from the gas nozzle, a dry state can be maintained such that droplets do not grow at the ceiling of the housing. Thus, it is possible to prevent droplets containing contaminants from falling onto the substrate.

In a second aspect of the disclosure, according to the first aspect, the control part causes the gas to be ejected from the gas nozzle at a predetermined timing.

According to the second aspect of the disclosure, since the gas can be caused to be ejected from the gas nozzle at a predetermined timing, the ceiling of the housing can be kept in a dried state in which droplets do not grow.

In a third aspect of the disclosure, according to the first aspect, the washing apparatus further includes a detection part that detects droplets adhered to the ceiling. The control part causes the gas to be ejected from the gas nozzle upon detection of the droplets by the detection part.

According to the third aspect of the disclosure, since the gas can be caused to be ejected from the gas nozzle when necessary, i.e., when the detection part detects droplets, energy for ejecting the gas can be saved.

In a fourth aspect of the disclosure, according to the third aspect, the control part causes the gas to be ejected from the gas nozzle in a case where an amount of the droplets detected by the detection part exceeds a threshold.

According to the fourth aspect of the disclosure, since the gas can be caused to be ejected from the gas nozzle when necessary, i.e., when the amount of droplets detected by the detection part exceeds a threshold, energy for ejecting the gas can be further saved.

In a fifth aspect of the disclosure, according to any one of the first to fourth aspects, the washing apparatus further includes a drain provided on a bottom surface of the housing. The drain is arranged at a position sandwiching the holding part between the drain and the gas nozzle in a plan view.

According to the fifth aspect of the disclosure, droplets adhering to the ceiling above the holding part can be caused to move, by the gas ejected from the gas nozzle toward the ceiling, to the drain side provided at a position sandwiching the holding part between the drain and the gas nozzle in a plan view. Thus, droplets can be discharged outside via the drain without dropping onto the substrate.

In a sixth aspect of the disclosure, according to any one of the first to fourth aspects, the gas nozzle is capable of changing an orientation in at least one of a horizontal direction and an up-down direction.

According to the sixth aspect of the disclosure, since the direction of the gas ejected from the gas nozzle is adjustable in at least one of the horizontal direction and the up-down direction, even if the spot on the ceiling at which droplets are likely to accumulate changes depending on conditions, the gas can be caused to be ejected toward the droplets by adjusting the direction of the gas ejected from the gas nozzle.

In a seventh aspect of the disclosure, according to the third or fourth aspect, the detection part is a camera, at least a part of the ceiling has a transparent part, and the camera is positioned above the transparent part.

According to the seventh aspect of the disclosure, since generation of droplets adhering to the ceiling can be visually detected by the camera, the droplets can be caused to move after more reliably detecting liquid adhering to the ceiling. Thus, energy for ejecting the gas can be further saved.

According to the embodiments of the disclosure, in the washing apparatus of the semiconductor substrate processing apparatus, droplets containing contaminants can be prevented from falling onto the semiconductor substrate from the ceiling of the washing apparatus.

DESCRIPTION OF EMBODIMENTS

Embodiments of the disclosure prevent droplets containing contaminants from falling from a ceiling of a washing apparatus onto a semiconductor substrate in a washing apparatus of a semiconductor substrate processing apparatus.

DESCRIPTION OF EMBODIMENTS

First Embodiment

Figure 1:
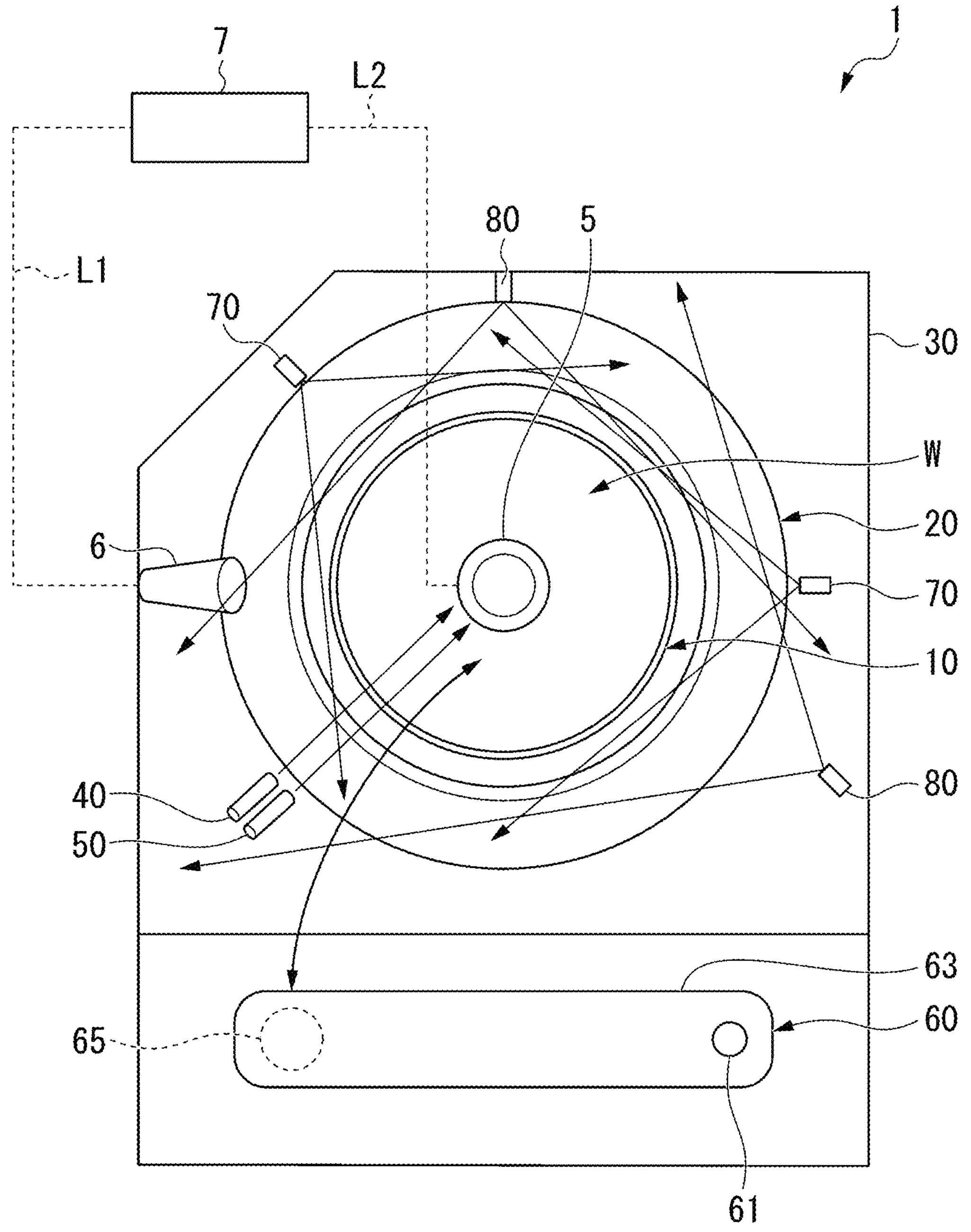
FIG. 1 is a schematic plan view of a washing apparatus according to a first embodiment of the disclosure.
Figure 2:
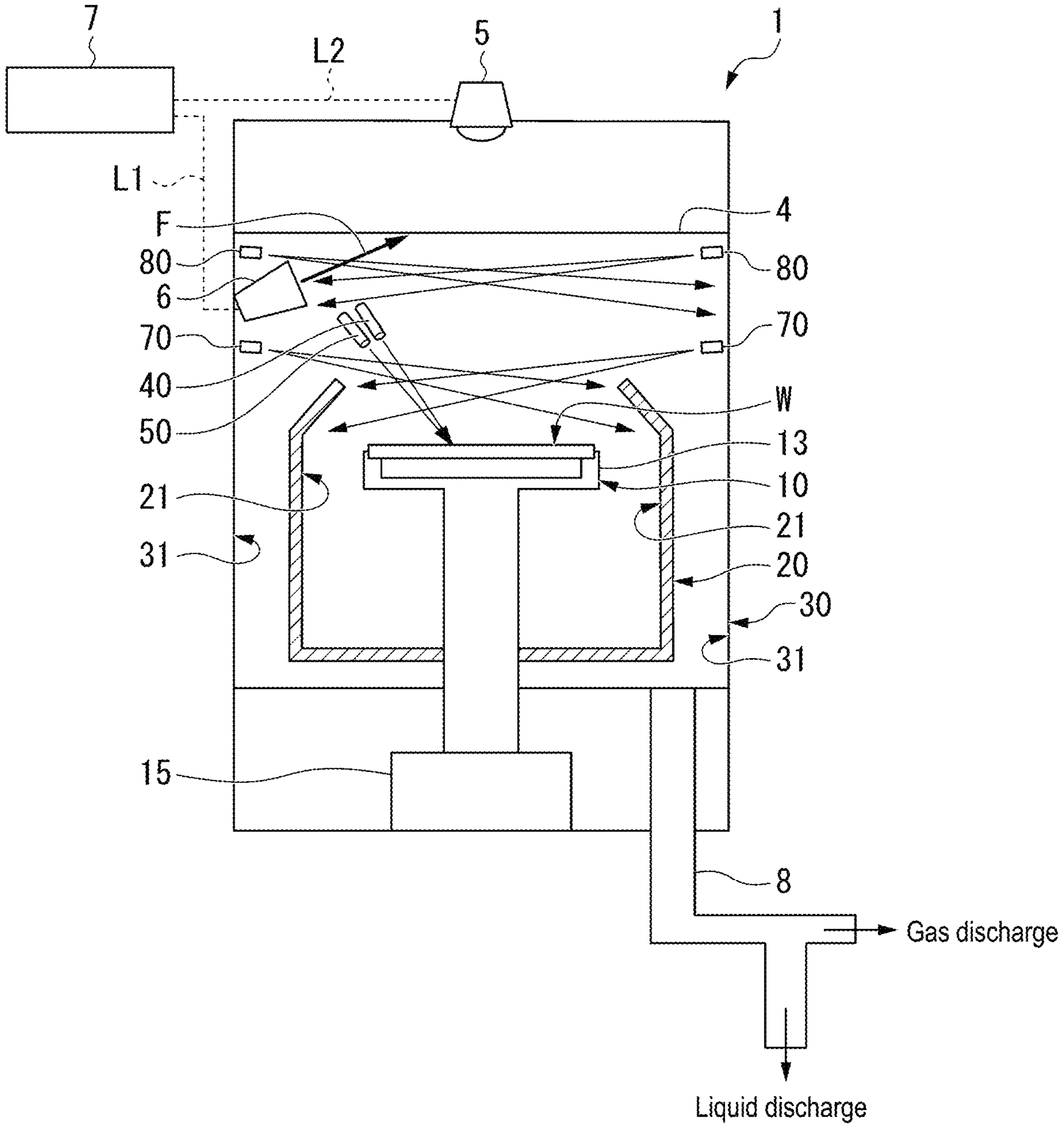
FIG. 2 is a schematic lateral cross-sectional view of the washing apparatus according to the first embodiment of the disclosure.

Hereinafter, a washing apparatus 1 according to a first embodiment of the disclosure will be described with reference to FIG. 1 and FIG. 2.

The washing apparatus 1 includes a holding part 10 that holds a semiconductor substrate W serving as an object to be washed, a washing cup 20 that surrounds the holding part 10 to prevent scattering of a washing liquid, a housing 30 that surrounds the washing cup 20, a ceiling 4 of the housing 30, a first washing nozzle 40 that is installed at a predetermined position in the housing 30 to wash the surface of the semiconductor substrate W with a chemical solution, a second washing nozzle 50 that is installed at a predetermined position in the housing 30 to rinse-wash the surface of the semiconductor substrate W, a third washing nozzle 70 that is installed at a predetermined position in the housing 30 separately from the first washing nozzle 40 and the second washing nozzle 50 to wash an inner wall 21 of the washing cup 20, a fourth washing nozzle 80 that is installed at a predetermined position in the housing 30 to wash an inner wall 31 of the housing 30, a washing arm 60 used for scrub-washing the semiconductor substrate W, a detection part 5 that is provided above the ceiling 4 and detects droplets adhering to the ceiling 4, a gas nozzle 6 that ejects a gas toward the ceiling 4, a control part 7 that performs control on the gas nozzle 6, and a drain 8 that discharges droplets and exhaust to outside. Herein, the first washing nozzle 40 and the second washing nozzle 50 may sometimes be collectively referred to as a washing nozzle that supplies a washing liquid to the semiconductor substrate W. The semiconductor substrate W may sometimes be simply referred to as a substrate W.

The holding part 10 supports the semiconductor substrate W approximately horizontally in a state in which the processed surface thereof faces upward. That is, the holding part 10 is configured to hold the outer circumference of the semiconductor substrate W by a chuck mechanism 13. The holding part 10 is rotationally driven by a drive part 15.

The washing cup 20 is formed in a cup shape with an upper surface opened to surround the holding part 10. The housing 30 surrounds the washing cup 20 to form the outer wall of the washing apparatus 1.

The washing nozzle (first washing nozzle 40 and second washing nozzle 50) sprays a liquid onto the surface of the semiconductor substrate W. The first washing nozzle 40 sprays a chemical solution (e.g., an acid-based chemical solution (DHF or the like) for a secondary washing), and the second washing nozzle 50 sprays a rinse liquid (e.g., pure water).

The third washing nozzle 70 and the fourth washing nozzle 80 spray a washing liquid (e.g., pure water). The third washing nozzle 70 sprays the washing liquid toward the inner wall 21 of the washing cup 20, and the fourth washing nozzle 80 sprays the washing liquid toward the inner wall 31 of the housing 30.

The ceiling 4 is a ceiling 4 of the housing 30. In this embodiment, at least a part of the ceiling 4 is composed of a transparent part made of a transparent member (e.g., a transparent plastic material or glass material). The transparent part is provided at a position overlapping with the semiconductor substrate W held by the holding part 10 in a plan view. The example shown in FIG. 2 shows a case where the entire ceiling 4 is the transparent part.

The detection part 5 is provided above the ceiling 4 and detects droplets adhering to the ceiling 4 of the housing 30 via the transparent part of the ceiling 4. In this embodiment, the detection part 5 is a camera. The detection part 5, which is a camera, photographs the ceiling 4 to which droplets are adhered, and detects the size of droplets, e.g., the diameter of droplets, by performing conventional image analysis on the image data of the ceiling 4.

The gas nozzle 6 is provided at a position sandwiched between the third washing nozzle 70 and the fourth washing nozzle 80 in the up-down direction and ejects a gas toward a position overlapping with the holding part 10 in a plan view on the ceiling 4. A reference sign F in FIG. 2 indicates the flow of the gas. With the gas ejected from the gas nozzle 6 colliding with the droplets adhering to the ceiling 4, the droplets can be caused to move on the ceiling 4 in a state remaining stuck to the ceiling 4 due to surface tension. The gas may be air, but is not necessarily limited to air. In this embodiment, the gas nozzle 6 sprays air toward the ceiling 4 from the diagonally lower side.

The control part 7 is electrically connected to the detection part 5 and the gas nozzle 6 via connection lines L2 and L1, and determines whether the size of droplets adhering to the ceiling 4 received from the detection part 5 exceeds a threshold. In the case of exceeding the threshold, the control part 7 sends a signal for ejecting the gas to the gas nozzle 6, and causes a valve (not shown) of the gas nozzle 6 to open to eject the gas from the gas nozzle 6.

The control part 7 includes a CPU, a memory, etc. The CPU performs arithmetic processing for executing the functions of the control part 7. In addition to a program describing the functions to be executed by the CPU, the memory stores thresholds of droplets, opening degrees of an opening-closing valve of the gas nozzle 6, etc. set in advance. All of these are rewritable. According to the program, the control part 7 calls the threshold of droplets from the memory and compares the threshold with the size of droplets detected by the detection part 5. As a result, in the case where the size of droplets is larger than the threshold, the control part 7 causes the gas to be ejected from the gas nozzle 6 toward the ceiling 4 by opening the opening-closing valve (not shown) of the gas nozzle 6.

Herein, it has been described that the detection part 5 has a function of detecting the size of droplets, e.g., the diameter of droplets, based on image data of the ceiling 4 which is photographed by the detection part 5 and to which droplets are adhered. In that case, the detection part 5, which is a camera, may also include a memory storing a program that performs image analysis on the image data to measure the size of droplets, and a CPU that executes the program.

On the other hand, the control part 7 may also have a function of detecting the size of droplets based on the image data of the ceiling 4. In this case, the detection part 5 sends image data of the ceiling 4 to the control part 7, the memory included in the control part 7 receiving the image data from the detection part 5 stores a program that performs image analysis on the image data of the ceiling 4 to measure the size of droplets, and the CPU included in the control part 7 executes the program. The memory of the control part 7 or the memory of the detection part 5 may store a time interval for causing the detection part 5 to photograph the ceiling 4. This time interval is also rewritable.

Herein, in the case where the diameter of droplets significantly exceeds the threshold, it is considered that there is a high possibility that the droplets will fall. Thus, the flow rate of the gas ejected from the gas nozzle 6 may be reduced and the droplets may be caused to move with the gas at a smaller flow rate. In this case, the gas may be ejected at a low flow rate by opening the opening-closing valve of the gas nozzle 6 at an opening degree smaller than usual. In this case, a second threshold larger than the threshold may be set, and in the case where the diameter of droplets exceeds the second threshold, the opening-closing valve of the gas nozzle 6 may be opened at an opening degree smaller than usual.

The drain 8 is arranged at a position sandwiching the holding part 10 between the drain 8 and the gas nozzle 6 in a plan view. The drain 8 discharges, to outside, droplets dropped from the ceiling 4 avoiding the semiconductor substrate W and performs appropriate gas exhaustion to keep the pressure in the housing 30 constant even when the gas is ejected from the gas nozzle 6 into the housing 30. The drain 8 is provided on the bottom surface of the housing 30.

In the washing apparatus 1 according to the first embodiment including such a configuration, the detection part 5 photographs the ceiling 4 at each time interval set to, for example, a 5-second interval. Based on the image data of the photographed ceiling 4, the diameter of droplets is detected according to image analysis in the detection part 5. Each time the control part 7 receives from the detection part 5 information about the diameter of droplets sent from the detection part 5 to the control part 7 each time photographing is performed, the control part 7 determines whether the diameter exceeds the threshold (e.g., 5 mm). For example, in the case where the diameter of droplets is 4 mm at a time t0, the control part 7 does not open the opening-closing valve of the gas nozzle 6. Then, in the case where the diameter of droplets is, for example, 5 mm at a time t1 as well, the control part 7 does not open the opening-closing valve of the gas nozzle 6. Further thereafter, in the case where the diameter of droplets is, for example, 5.5 mm at a time t2, since the diameter of droplets exceeds the threshold of 5 mm, the control part 7 opens the opening-closing valve of the gas nozzle 6 and causes the gas to be ejected from the gas nozzle 6 toward a position overlapping with the semiconductor substrate W in a plan view on the ceiling 4. The gas ejected from the gas nozzle 6 toward the ceiling 4 collides with the droplets stuck to the ceiling 4 due to surface tension. Thus, pushed out by the collided gas, the droplets move along the ceiling 4 toward a direction opposite to the gas nozzle 6 in the housing 30 in a state stuck to the ceiling 4 due to surface tension. The droplets moved in the direction opposite to the gas nozzle 6 reach the inner wall 31 of the housing 30. On the inner wall 31 of the housing 30, there may be cases where droplets exceeding the threshold the previous time have been caused to move by the ejected gas and are stuck to the inner wall 31 due to surface tension, and they become larger droplets by merging with droplets that newly move to the inner wall 31. In this manner, the gravity acting on the larger droplets overcomes the surface tension, and the larger droplets fall along the inner wall 31 toward the lower side the housing 30. The fallen droplets are discharged to outside from the drain 8 which is opened on the lower side of the housing 30.

In the above example, the time interval at which the detection part 5 photographs the ceiling 4 has been set to be every 5 seconds, but it may be set to any time interval. Further, in the above example, a case of exceeding 5 mm has been set as the threshold, but it may be set to any threshold. Further, as described above, a second threshold may be set, and in the case where the diameter of droplets exceeds the second threshold, the flow rate of the gas ejected from the gas nozzle 6 may be reduced.

In addition to the method in which the detection part 5 photographs the ceiling 4 at any time interval, the detection part 5 may also constantly monitor the ceiling 4, and when the control part 7 determines that the diameter of droplets detected by the detection part 5 or the control part 7 based on the monitored image exceeds the threshold, the control part 7 may open the opening-closing valve of the gas nozzle 6 to cause the gas to be ejected from the gas nozzle 6 toward the ceiling 4. In this case, since the detection part 5 is constantly monitoring the ceiling 4, the gas can be caused to be ejected from the gas nozzle 6 before the size of droplets becomes too large.

Herein, in this embodiment, the gas nozzle 6 is configured to be capable of changing the orientation in at least one of the horizontal direction and the up-down direction. For example, as shown in FIG. 2, in the case where the gas nozzle 6 is provided at an angle at which the gas ejected from the gas nozzle 6 collides with the ceiling 4 from the diagonally lower side, by changing the orientation of this gas nozzle 6 in the horizontal direction, even if the spot at which droplets are likely to be generated moves in the horizontal direction on the ceiling 4, the ejection direction of the gas nozzle 6 can be adjusted such that the gas is ejected onto the droplets.

In the case where the gas nozzle 6 is capable of changing the orientation not only in the horizontal direction but also in the up-down direction, the gas can be caused to be ejected to a spot closer to or a spot farther from the gas nozzle 6 on the ceiling 4. Thus, even if the location at which droplets are likely to be generated on the ceiling 4 moves to a spot closer to or a spot farther from the gas nozzle 6, the gas can be ejected onto the droplets in a pinpointed manner. Since the spot at which droplets are likely to be generated on the ceiling 4 can be identified during trial runs or the like of the washing apparatus 1, it is possible to pre-set the gas nozzle 6 to be oriented toward the spot at which droplets are likely to be generated. In this embodiment, the gas nozzle 6 is of a type with its orientation manually adjustable, but the orientation of the gas nozzle 6 may also be set to be adjustable by a remote operation.

Herein, the timing at which the gas is ejected from the gas nozzle 6 is preferably may be after the semiconductor substrate W is transported into the housing 30 and before washing of the substrate is performed, in a process in which a shutter (not shown) provided at the housing 30 of the washing apparatus 1 is opened, the semiconductor substrate W is transported into the housing 30 from a substrate transport robot (not shown), and with the semiconductor substrate W held by the holding part 10, washing of the semiconductor substrate W is performed while rotating the semiconductor substrate W at high speed. In an embodiment, the gas is not caused to be ejected from the gas nozzle 6 while washing the semiconductor substrate W. The gas may also be ejected from the gas nozzle 6 before the semiconductor substrate W is transported into the housing 30.

The position at which the gas nozzle 6 is provided is not limited to being sandwiched between the third washing nozzle 70 and the fourth washing nozzle 80 in the up-down direction, but may also be provided lower than the third washing nozzle 70 or higher than the fourth washing nozzle 80.

The washing apparatus 1 of this embodiment may be provided at, for example, a CMP apparatus, a plating apparatus, and a bevel polishing apparatus, among semiconductor substrate processing apparatuses.

According to the washing apparatus 1 according to this embodiment, in the washing apparatus 1 of the semiconductor substrate processing apparatus, it is possible to prevent droplets containing contaminants from falling onto the semiconductor substrate W from the ceiling 4 of the washing apparatus 1. That is, the droplets adhering to the ceiling 4 of the housing 30 can be caused to move, by the gas ejected from the gas nozzle 6, to a position at which they do not fall onto the semiconductor substrate W. Thus, it is possible to prevent droplets containing contaminants from falling onto the semiconductor substrate W.

Further, since the gas is caused to be ejected from the gas nozzle 6 when the amount of droplets detected by the detection part 5 exceeds the threshold, energy for ejecting the gas can be saved.

Further, the droplets adhered to the ceiling 4 above the holding part 10 can be caused to move, by the gas ejected from the gas nozzle 6 toward the ceiling 4, to the drain 8 side provided at a position sandwiching the holding part 10 between the drain 8 and the gas nozzle 6 in a plan view. Thus, the droplets can be discharged to outside via the drain 8 without dropping onto the semiconductor substrate W.

Further, since the direction of the gas ejected from the gas nozzle 6 is adjustable in at least one of the horizontal direction and the up-down direction, even if the spot of the ceiling 4 at which droplets are likely to accumulate changes depending on conditions, the gas can be caused to be ejected toward the droplets by adjusting the direction of the gas ejected from the gas nozzle 6.

Furthermore, since generation of droplets adhering to the ceiling 4 can be visually detected by the camera, the droplets can be caused to move after more reliably detecting the liquid adhered to the ceiling 4. Thus, energy for ejecting the gas can be further saved.

Second Embodiment

Hereinafter, a washing apparatus 11 according to a second embodiment of the disclosure will be described with reference to FIG. 3. Configurations similar to those in the first embodiment will be labeled with the same reference signs as in the first embodiment and descriptions thereof will be omitted. Only configurations different from the first embodiment will be described.

Figure 3:
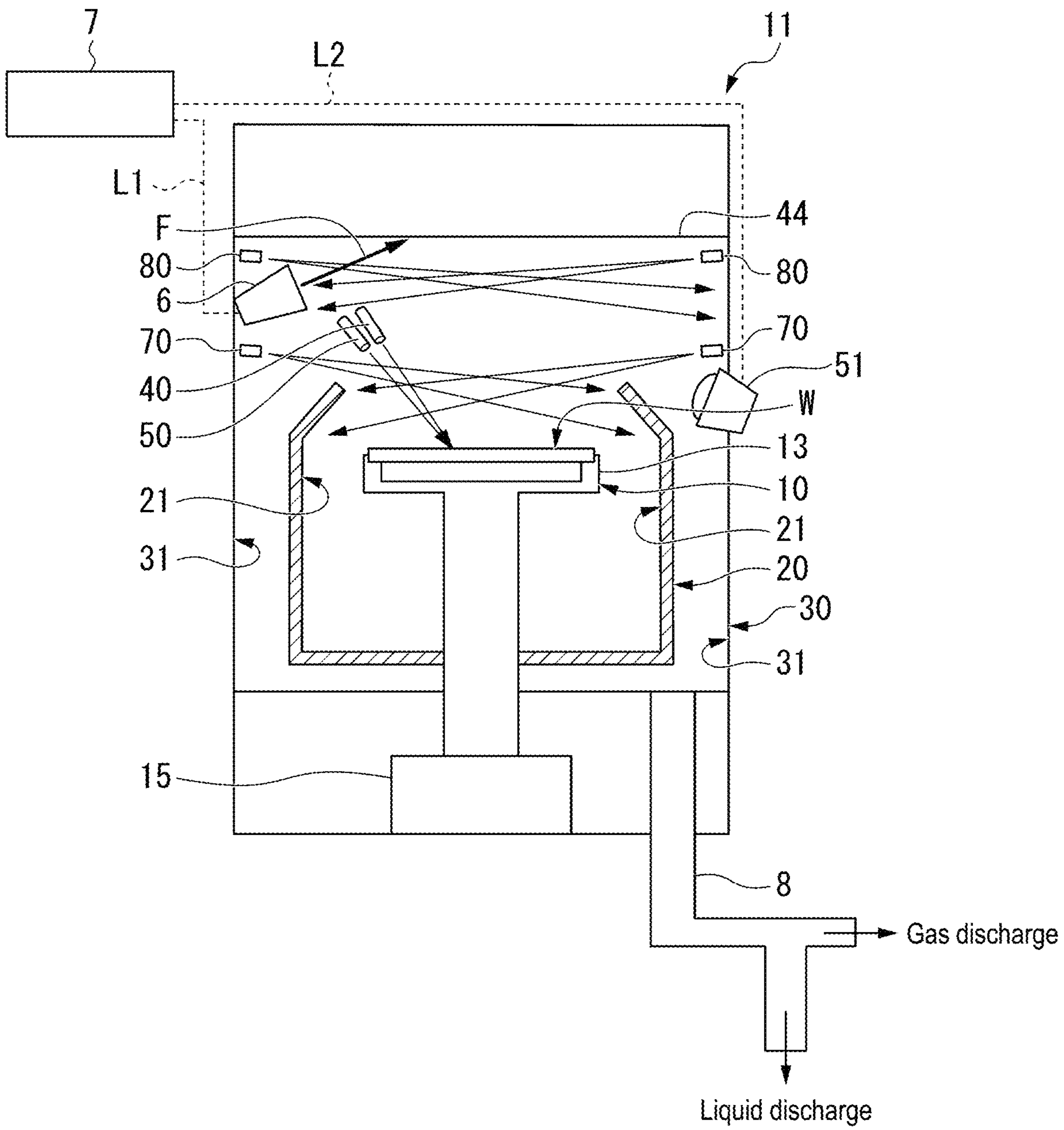
FIG. 3 is a schematic lateral cross-sectional view of a washing apparatus according to a second embodiment of the disclosure.

As shown in FIG. 3, in the washing apparatus 11 according to the second embodiment of the disclosure, different from the ceiling 4 of which at least a part is composed of the transparent part as in the first embodiment, the transparent part is not provided at a ceiling 44. Furthermore, a detection part 51 differs from the detection part 5 of the first embodiment in that the detection part 51 is installed lower than the ceiling 44. Herein, the detection part 51 of the second embodiment is also a camera.

In the washing apparatus 11 including such a configuration, the detection part 51 photographs, from below the ceiling 44, the ceiling 44 to which droplets are adhered. In this case as well, in the same manner as in the first embodiment, the control part 7 determines whether the information about the diameter of droplets adhered to the ceiling 44 received from the detection part 51 exceeds a threshold, and in the case of exceeding the threshold, the control part 7 sends a signal for ejecting the gas to the gas nozzle 6 and causes the gas to be ejected from the gas nozzle 6 toward the ceiling 44 by causing a valve (not shown) of the gas nozzle 6 to open. A reference sign F in FIG. 3 indicates the flow of the gas.

In the washing apparatus 11 according to such a second embodiment as well, the same effects as in the washing apparatus 1 of the first embodiment can be achieved.

Herein, in the above description, although it has been described that the detection part 5 is a camera, the detection part 5 of the disclosure is not necessarily limited to a camera.

For example, the detection part 5 may also be a conventional vehicle-mounted rain sensor or raindrop detection sensor (liquid droplet sensor). This sensor is provided above the ceiling 4 and is configured to irradiate LED light from diagonally above toward the transparent part of the ceiling 4 of the housing 30 in the first embodiment and detect the reflected light thereof. Since the reflectance in the case where droplets are adhered to the transparent part differs from the case where droplets are not adhered, this sensor can detect presence of the droplets. Thus, when the presence of droplets is detected by the liquid droplet sensor, the control part 7 may cause the gas nozzle 6 to eject the gas. In this case, since the gas is ejected from the gas nozzle 6 when droplets are detected, at a stage before the droplets grow, the droplets can be caused to move to a position at which they do not fall onto the substrate W.

Alternatively, the detection part 5 may also be a humidity sensor (not shown) provided in the housing 30 for measuring the humidity in the housing 30. In that case, in the case where the humidity in the housing 30 is 100%, it is considered that there is a high probability that droplets adhere to the ceiling 4. Thus, it may be assumed that droplets are adhered to the ceiling 4 and the gas may be caused to be ejected from the gas nozzle 6 toward the ceiling 4.

Third Embodiment

Hereinafter, a washing apparatus 12 according to a third embodiment of the disclosure will be described with reference to FIG. 4. Configurations similar to those in the second embodiment will be labeled with the same reference signs as in the second embodiment and descriptions thereof will be omitted. Only configurations different from the second embodiment will be described.

Figure 4:
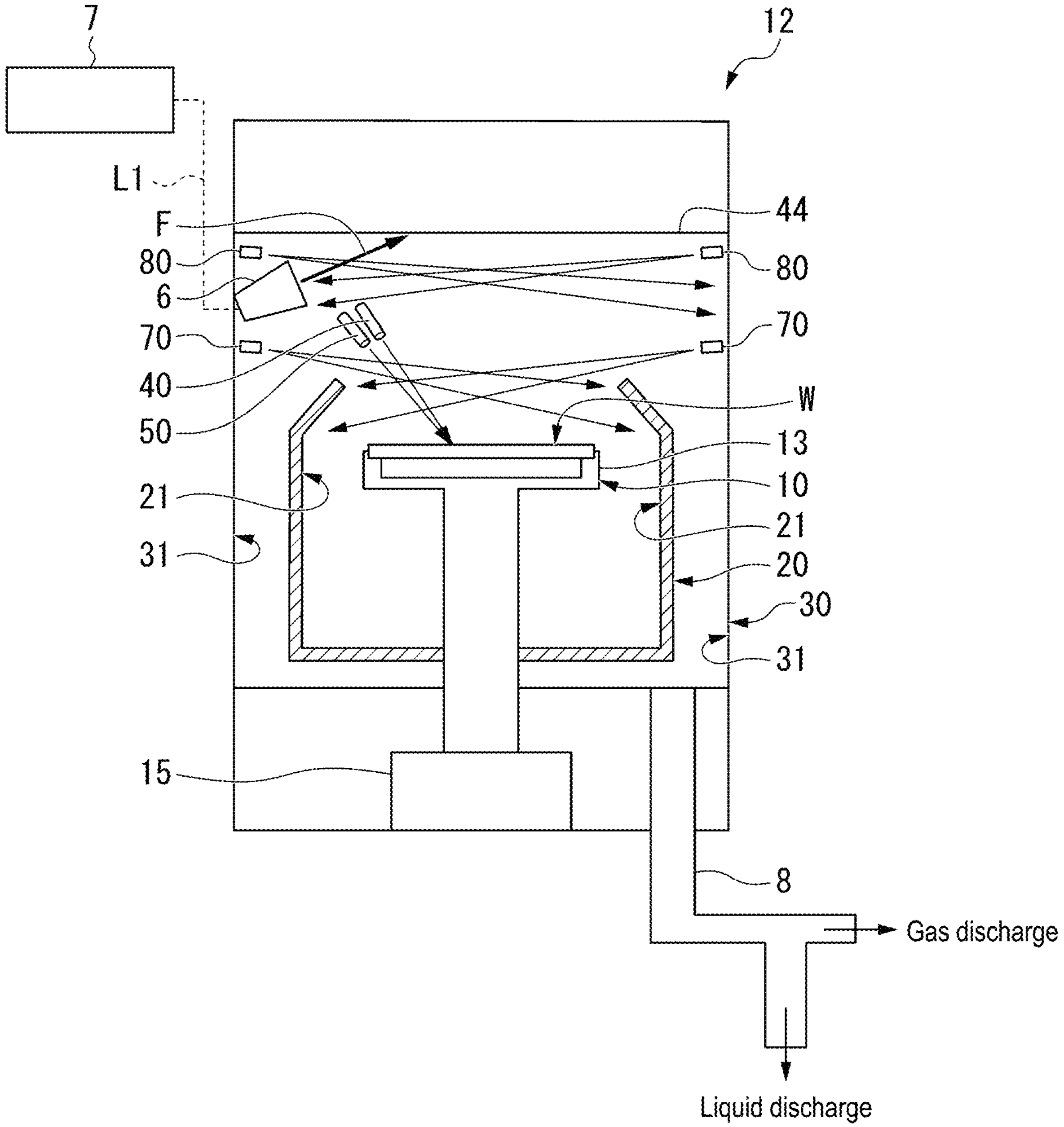
FIG. 4 is a schematic lateral cross-sectional view of a washing apparatus according to a third embodiment of the disclosure.

As shown in FIG. 4, the washing apparatus 12 according to the third embodiment of the disclosure differs from the washing apparatus 11 of the second embodiment in that the detection part 51 and the connection line L2 connecting between the control part 7 and the detection part 51 in the washing apparatus 11 of the second embodiment are not provided.

In such a washing apparatus 12 according to the third embodiment, since the detection part is not provided, the gas is ejected from the gas nozzle 6 toward the ceiling 4 at a predetermined timing. The predetermined timing means that the gas is ejected for several seconds or several minutes, for example, before the substrate W is transported to the washing apparatus 12, after the washing process is performed on the substrate W by the washing apparatus 12, during the washing process performed on the substrate W in the washing apparatus 12, or during standby of the washing apparatus 12 in which the substrate W is not present in the washing apparatus 12. Further, the predetermined timing may also be each time one substrate W is subjected to the washing process, or after the washing process has been performed on a plurality of substrates W. The frequency (time interval) and the ejection time of ejecting the gas are set appropriately such that the droplets do not grow and the droplets are prevented from falling from the ceiling 4 onto the substrate W. The larger the flow rate of the gas ejected from the gas nozzle 6, the more likely it is to create an environment in which droplets do not grow on the ceiling 4 of the housing 30. The flow rate of the gas ejected from the gas nozzle 6 can be adjusted appropriately by adjusting the ejection time of each gas ejection from the gas nozzle 6 and the ejection interval until the next ejection.

If an environment in which droplets do not grow on the ceiling 4 of the housing 30 can be created by appropriately adjusting the ejection time and the ejection interval at which the gas is ejected from the gas nozzle 6, the droplets can be prevented from falling from the ceiling 4 onto the substrate W. Herein, the environment in which droplets do not grow includes the case where droplets are not generated and the case where small droplets that do not fall onto the substrate W remain as the droplets do not grow even though generated. These settings can be realized by setting the predetermined timing, the ejection time, and the time interval (frequency) at which the gas is caused to be ejected from the gas nozzle 6, in the program executed by the control part 7. The gas may be ejected in a single shot. Thus, as an example, it may be set to eject the gas for 5 seconds, for example, in a single shot before the substrate W is transported to the washing apparatus 12 and/or after the washing process is performed on the substrate W by the washing apparatus 12. Further, as an example, it may be set to eject the gas for 10 seconds every minute during the washing process performed on the substrate W in the washing apparatus 12 or during standby of the washing apparatus 12 in which the substrate W is not present in the washing apparatus 12.

Although the embodiments of the disclosure have been described in detail above with reference to the drawings, the specific configurations are not limited to these embodiments and their modification examples, but also include designs within scope without departing from the gist of the disclosure and combinations of the embodiments and the modification examples.

The invention claimed is:

1. A washing apparatus comprising:

a housing;

a holding part that holds a substrate arranged in the housing;

a washing nozzle that supplies a washing liquid to the substrate held by the holding part;

a gas nozzle that ejects a gas toward a ceiling of the housing;

a control part that controls the gas nozzle; and a detection part that detects droplets adhered to the ceiling, wherein the control part causes the gas to be ejected from the gas nozzle upon detection of the droplets by the detection part.

2. The washing apparatus according to claim 1, wherein the control part causes the gas to be ejected from the gas nozzle in a case where an amount of the droplets detected by the detection part exceeds a threshold.

3. The washing apparatus according to claim 1, further comprising a drain provided on a bottom surface of the housing, wherein the drain is arranged at a position sandwiching the holding part between the drain and the gas nozzle in a plan view.

4. The washing apparatus according to claim 1, wherein the gas nozzle is capable of changing an orientation in at least one of a horizontal direction and an up-down direction.

5. The washing apparatus according to claim 1, wherein the detection part is a camera, at least a part of the ceiling has a transparent part, and the camera is positioned above the transparent part.

* * * * *